United States Patent
Ding et al.

(10) Patent No.: US 12,251,782 B2
(45) Date of Patent: Mar. 18, 2025

(54) DEVICE FOR PRESSING MATERIALS GUIDED BY ROLLERS FOR CARPENTRY CUTTING

(71) Applicant: HARVEY WOODWORKING TECHNOLOGY (NANJING) CO., LTD, Nanjing (CN)

(72) Inventors: Jian Ding, Nanjing (CN); Xiaogang Qin, Nanjing (CN); Qinghai Xu, Nanjing (CN); Huazhong Sun, Nanjing (CN)

(73) Assignee: HARVEY WOODWORKING TECHNOLOGY (NANJING) CO., LTD, Nanjing (CN)

( * ) Notice: Subject to any disclaimer, the term of this patent is extended or adjusted under 35 U.S.C. 154(b) by 301 days.

(21) Appl. No.: 18/052,239

(22) Filed: Nov. 3, 2022

(65) Prior Publication Data
US 2023/0321774 A1    Oct. 12, 2023

(30) Foreign Application Priority Data
Mar. 25, 2022   (CN) .......................... 202210307324.4

(51) Int. Cl.
   *B23Q 1/00*   (2006.01)
   *B23Q 3/00*   (2006.01)
(52) U.S. Cl.
   CPC .................. *B23Q 3/002* (2013.01)

(58) Field of Classification Search
CPC .......... B23Q 3/00; B23Q 3/002; B23Q 3/005; B23Q 3/067; B23Q 3/152; B23P 11/00; B23P 11/005; B25B 11/00; B25B 11/02
See application file for complete search history.

(56) References Cited

U.S. PATENT DOCUMENTS

| | | | |
|---|---|---|---|
| 2011/0190936 A1* | 8/2011 | Koeder ..................... | B27C 5/10 901/47 |
| 2021/0138524 A1* | 5/2021 | Wu .......................... | B23Q 3/06 |
| 2023/0302593 A1* | 9/2023 | Asakawa ................ | B23P 23/02 |
| 2023/0321774 A1* | 10/2023 | Ding ....................... | B23Q 3/002 144/242.1 |

* cited by examiner

*Primary Examiner* — Lee D Wilson
(74) *Attorney, Agent, or Firm* — HAUPTMAN HAM, LLP (57) ABSTRACT

A device for pressing materials guided by rollers for a carpentry cutting includes a device body, two base body fixing blocks, an adjustment mechanism and two pressing mechanisms. The device body includes a fist base body and a second base body. The two base body fixing blocks are arranged to press both sides of the base body, respectively. The adjustment mechanism includes a pushing mechanism configured to move the two pressing mechanisms along a direction from the first base body toward the second base body, two compressing mechanisms configured to compress a play between the first base body and the pressing mechanisms and a reset mechanism. Each of the pressing mechanisms includes a roller fixing block connected with the sliding block, and two rollers with a same rolling direction, the two rollers are respectively mounted on both sides of the roller fixing block.

8 Claims, 5 Drawing Sheets

DEVICE FOR PRESSING MATERIALS GUIDED BY ROLLERS FOR CARPENTRY CUTTING

RELATED APPLICATIONS

The present application claims priority from Chinese Application Number 202210307324.4, filed Mar. 25, 2022, the disclosure of which is hereby incorporated by reference herein in its entirety.

TECHNICAL FIELD

The present disclosure relates to the field of carpentry technology, and in particular relates to a device for pressing materials guided by rollers for a carpentry cutting.

BACKGROUND

At present, when a carpenter machines lumber, the lumber is pushed to the cutter. In order to ensure safety and cutting precision, and to prevent the lumber from rebounding, which causes safety accidents, specific tools are required to press the materials. However, the existing feather boards have the following deficiencies.
1. The installation is inconvenient. The traditional feather board is required to be pre-pressed proximate to the lumber and then to be locked before use. Since it is pre-pressed and locked with one hand, it is easy to cause the feather board not parallel to the table, resulting in failing to press the materials effectively.
2. The adjustment of the pressing force is inconvenient. When adjusting the pressing force, it is required to loosen the fixing at both ends and manually control the deformation magnitude of the feather board to adjust the pressing force each time.

SUMMARY

To solve the problems of the tedious operations for fixing the existing feather board and adjusting the pressing force, the present disclosure provides a device for pressing materials guided by rollers for a carpentry cutting.

The technical solutions adopted by the present invention to solve the technical problems are that: a device for pressing materials guided by rollers for a carpentry cutting includes a device body, two base body fixing blocks, an adjustment mechanism and two pressing mechanisms.

The device body includes a first base body and a second base body. The first base body and the second base body are arranged adjacent to each other and connected with each other.

The two base body fixing blocks are arranged to press on both sides of the device body, respectively.

The adjustment mechanism includes a pushing mechanism configured to move the two pressing mechanisms along a direction from the first base body toward the second base body, two compressing mechanisms configured to compress a play between the first base body and the pressing mechanisms and a reset mechanism.

The pushing mechanism includes a sliding block, a pressing bar and an eccentric block, wherein the sliding block is located inside the second base body and is connected with the two pressing mechanisms. The eccentric block is mounted inside the first base body. The pressing bar is connected with the sliding block. One end of the pressing bar is in contacted with an outer circumferential surface of the eccentric block, and the other end is extended into the sliding block.

The two compressing mechanisms are symmetrically arranged on both sides of the pressing bar. Each of the two compressing mechanisms includes a fastening screw, a cushion block and a pressing spring. The fastening screw is connected with the sliding block. One end of the fastening screw is extended into the first base body, and the other end of the fastening screw is extended into the sliding block. Moreover, the fastening screw is provided with the cushion block, and one side of the cushion block away from the fastening screw is provided with the pressing spring, and one end of the pressing spring away from the cushion block is extended to be in connection with the second base body.

The reset mechanism includes a reset spring, one end of the reset spring is sleeved on one end of the pressing bar away from the first base body, and the other end of the pressing bar is extended into the pressing mechanisms.

Each of the pressing mechanisms includes a roller fixing block connected with the sliding block and two rollers with the same rolling direction, the two rollers are respectively mounted on both sides of the roller fixing block.

As a further preferred embodiment of the present disclosure, the device for pressing the materials guided by the rollers for the carpentry cutting further includes two first bushings, two second bushings and two first guide rods. The two first bushings are mounted inside the first base body with respect to the pressing bar as a symmetry axis. The two second bushings are mounted inside the sliding block with respect to the pressing bar as a symmetry axis. One end of each of the first guide rods is inserted into one of the first bushings respectively, and the other end of each of the first guide rod is inserted into one of the second bushings respectively and extended to be in connection with the roller fixing block.

As a further preferred embodiment of the present disclosure, the device for pressing the materials guided by the rollers for the carpentry cutting further includes an ear-plate and a limiting groove. The ear-plate is arranged on the pressing bar. The limiting groove is arranged on one side of the sliding block proximate to the first base body, and the ear-plate on the pressing bar is mounted in cooperation with the limiting groove to limit an axial position of the pressing bar.

As a further preferred embodiment of the present disclosure, the device for pressing the materials guided by the rollers for the carpentry cutting further includes two third bushings and two second guide rods. The two third bushings are mounted inside the sliding block with respect to the pressing bar as a symmetry axis, and the third bushings are located between the pressing bar and the second bushings respectively. The second guide rods penetrate the sliding block and extend through the third bushings to be in connection with the roller fixing blocks.

As a further preferred embodiment of the present disclosure, the device for pressing the materials guided by the rollers for the carpentry cutting further includes a cylindrical nut mounted on one end of the pressing bar away from the eccentric block to connect the pressing bar with the sliding block.

As a further preferred embodiment of the present disclosure, the device for pressing the materials guided by the rollers for the carpentry cutting further includes limiting sliding channels and two stepped pins. The limiting sliding channels are arranged on both sides of the sliding block. The two stepped pins are symmetrically arranged on the two base body fixing blocks, and the stepped pins are permanently located in the limiting sliding channels.

As a further preferred embodiment of the present disclosure, the device for pressing the materials guided by the rollers for the carpentry cutting further includes two one-way bearings. The one-way bearings are mounted on the roller fixing blocks respectively to allow the rollers to roll in one direction.

As a further preferred embodiment of the present disclosure, the device for pressing the materials guided by the rollers for the carpentry cutting further includes an adjustment knob mounted on two side surfaces of the first base body corresponding to the eccentric block.

According the forgoing technical solutions, compared to the prior art, the present disclosure has the following advantages.

1. A feather board is used in the prior art, for which the pressing force between the feather board and the lumber is required to be manually adjusted before use, so as to find the optimal material-pressings, and then to fix them. In such a way, an error in the position of the fixed feather board occurs in the fixing process, and the feather board cannot be adjusted any more after the feather board has been fixed. The feather board cannot be adjusted again, unless the machine is shut down. In the process of cutting the lumber according to the present invention, the pushing amount of the pushing mechanism can be adjusted by the adjustment knob so as to adjust the compressing amount of the compressing mechanism, thereby adjusting the compressing force between the compressing mechanism and the lumber, so that the optimal material-pressing can be performed continually during the cutting process.

2. A compressing mechanism is provided in the present invention and a play exists between the sliding block and the roller fixing block, thereby not resulting in imbalance of the material-pressing due to the shape of the special-shaped board when cutting the special-shaped board, and ensuring the roller permanently abutting the lumber.

3. A limiting groove matched with the ear-plate is arranged on one side of the sliding block proximate to the first base body in the present invention, thereby limiting the axial position of the pressing bar, ensuring that the pressing bar permanently in contact with the eccentric block, and not resulting in offset of the pressing bar due to the running of the eccentric block.

4. The pressure initially exerted on the lumber is adjusted by adjusting the initial compressed amount of the pressing spring in the present invention.

5. In the present invention, a force is permanently present in the radial direction of the first guide rod by the cooperation of the stepped pins and the limiting sliding channels, thereby effectively preventing the radial deformation of the first guide rod and increasing the service life of the first guide rod.

BRIEF DESCRIPTION OF THE DRAWINGS

The present invention will be further described below with reference to the accompanying drawings and the embodiments

In the drawings: 1. First base body; 2. Base body fixing block; 3. Bearing; 4. Eccentric block; 5. Adjustment knob; 6. First guide rod; 7. First bushing; 8. Pressing bar; 9. Sliding block; 10. Second guide rod; 11 Second bushing; 12. Pressing spring; 13. Reset spring; 14. Second base body; 15. Roller fixing block; 16. One-way bearing; 17. Roller; 18. Hexagon socket head cap screw; 19. First cylindrical pin; 20. Second cylindrical pin; 21. Hexagon nut; 22. Fastening screw; 23. Cushion block; 24. Stepped pin; 25. Roller shaft; 26. Flat key; 27. Hexagon head tapping fastening screw; 28. Countersunk head screw; 29. Cylindrical nut; 30. Limiting sliding channel; 31. Ear-plate; 32. Limiting groove.

DETAILED DESCRIPTION OF THE EMBODIMENTS

The present invention will now be further described in detail with reference to the accompanying drawings. These drawings are all simplified schematic diagrams, and only illustrate the basic structure of the present invention in a schematic manner. Therefore, they only show the structures related to the present invention.

In the description of the present invention, it should be understood that the orientation or positional relationships indicated by the terms "left", "right", "upper", "lower", and the like, are based on the orientation or positional relationships illustrated in the accompanying drawings, and only for the convenience of describing the present invention and simplifying the description, rather than indicating or implying that the referred devices or elements have to have a particular orientation, and be constructed and operated in a particular orientation. The "first", "second" and the like, do not indicate the importance of the components, and therefore cannot be construed as the limitations to the present invention. The specific dimensions used in these embodiments are only for illustrating the technical solutions, and do not limit the protection scope of the present invention.

Embodiment 1

Provided in this embodiment is a preferred implementation, which is a device for pressing materials guided by rollers for a carpentry cutting. As illustrated in FIGS. 1 to 7, the device for pressing the materials guided by the rollers includes a device body, two base body fixing blocks 2, an adjustment mechanism and two pressing mechanisms. The two base body fixing blocks are arranged to press both sides of the device body, respectively. The adjustment mechanism is arranged on the device body, and is connected with the two pressing mechanisms. The pressing mechanisms adjust pressures between the pressing mechanisms and the lumber through the adjustment mechanism.

The device for pressing the materials guided by the rollers is arranged on a working surface, and the pressing mechanisms of the device for pressing the materials guided by the rollers are in contact with the lumber. The connection method between the device for pressing the materials guided by the rollers and the working surface is as follows. Sliding channels are arranged on the two base body fixing blocks 2 respectively, and T-shaped blocks are laterally arranged on either side of the two base body fixing blocks 2 respectively. The T-shaped blocks are connected to the two sliding channels through fasteners. Positions between the T-shaped blocks and the two sliding channels are adjusted by the cooperation of the T-shaped blocks and the T-shaped grooves on the working surface, which realizes the adjustment on the position between the device for pressing the materials guided by the rollers and the lumber, and realizes then the fixing of the position between the device for pressing the materials guided by the rollers and the lumber by fastening the fasteners. Preferably, the fasteners can be adopted as a cooperation of screws and nuts.

Further, the above device body includes a first base body 1 and a second base body 14. The first base body 1 and the second base body 14 are arranged adjacent to each other and connected with each other. Specifically, the first base body 1 and the second base body 14 are arranged between the two base body fixing blocks 2. Preferably, two side walls of the two base body fixing blocks 2 and the first base body 1 are provided with holes in cooperation with the hexagon socket head cup screws 18, and the first base body 1 is fixedly connected with the two base body fixing blocks 2 through mounting the hexagon socket head cup screws 18. Preferably, the first base body 1 is provided with a notch which is convenient for the operator to hold.

Further, the above-mentioned adjustment mechanism includes a pushing mechanism configured to move the two pressing mechanisms along a direction from the first base body 1 toward the second base body, and two compressing mechanisms configured to compress a play between the first base body 1 and the pressing mechanisms.

Specifically, the pushing mechanism includes a sliding block 9, a pressing bar 8 and an eccentric block 4. The sliding block 9 is located inside the second base body 14, and connected with the two pressing mechanisms. The eccentric block 4 is mounted inside the first base body 1, and adjustment knobs 5 are mounted on two side surfaces of the eccentric block 4 respectively. In order to facilitate the mounting of the eccentric block 4 and the adjustment knobs 5, both side walls of the first base body 1 are provided with holes. Specifically, in order to realize that the eccentric block 4 rotates along with the rotation of the adjustment knob 5, a bearing 3 is mounted on the outer circumference of the adjustment knob 5. Preferably, the adjustment knob 5 is locked with the eccentric block 4 by a countersunk head screw 28 so as to not drop from the opening on the first base body 1. Preferably, the eccentric block 4 is fixed with the adjustment knobs 5 by first cylindrical pins 19. The pressing bar 8 is connected with the sliding blocks 9, and one end of the pressing bar 8 is in contact with an outer circumferential surface of the eccentric block 4, and the other end is extended into the sliding block.

Specifically, the connection method between the first base body 1 and the sliding blocks 9 is as follows. Two first bushings 7 are arranged inside the first base body 1 with respect to the pressing bar 8 as the symmetrical axis, and two second bushings 11 are mounted inside the sliding blocks 9 with respect to the pressing bar 8 as the symmetrical axis. First guide rods 6 are arranged that one end of each of the first guide rods 6 is inserted into one of the first bushings 7 respectively and the other end of each of the first guide rods 6 is inserted into one of the second bushings 11 respectively and extended to be in connection with the pressing mechanism. The connection method between the above-mentioned pressing bar 8 and the sliding block 9 is as follows. A cylindrical nut 29 is mounted on one end of the pressing bar 8 away from the eccentric block 4, which allows the pressing bar 8 and the sliding block 9 to connect with each other as a whole. Preferably, a hexagon socket head cup screw is adopted as the cylindrical screw 29. The connection method between the sliding block 9 and the two pressing mechanisms is as follows. A third bushing is mounted inside the sliding block 9 with respect to the pressing bar 8 as the symmetrical axis. The second guide rods 10 are so arranged that the second guide rods 10 penetrate the sliding blocks 9 and extend through the third bushings to be in connection with the pressing mechanisms. Preferably, in order to facilitate the mounting of the first bushing 7, a groove configured to mount the first bushing 7 is arranged at a corresponding position inside the first base body 1. In order to facilitate the mounting of the second bushing 11, a groove configured to mount the second bushing 11 is arranged at a corresponding position inside the sliding block 9. In order to facilitate the mounting of the third bushing, a groove configured to mount the third bushing is arranged at a corresponding position inside the sliding block 9. Preferably, in order to fix the first bushing 7 in a better way, the second bushing 11 and the third bushing, the wire retainer rings are adopted to realize the connection between the first bushing 7 and the first base body 1, the connection between the second bushing 11 and the sliding block, and the connection between the third bushing and the sliding block.

Figure 1:
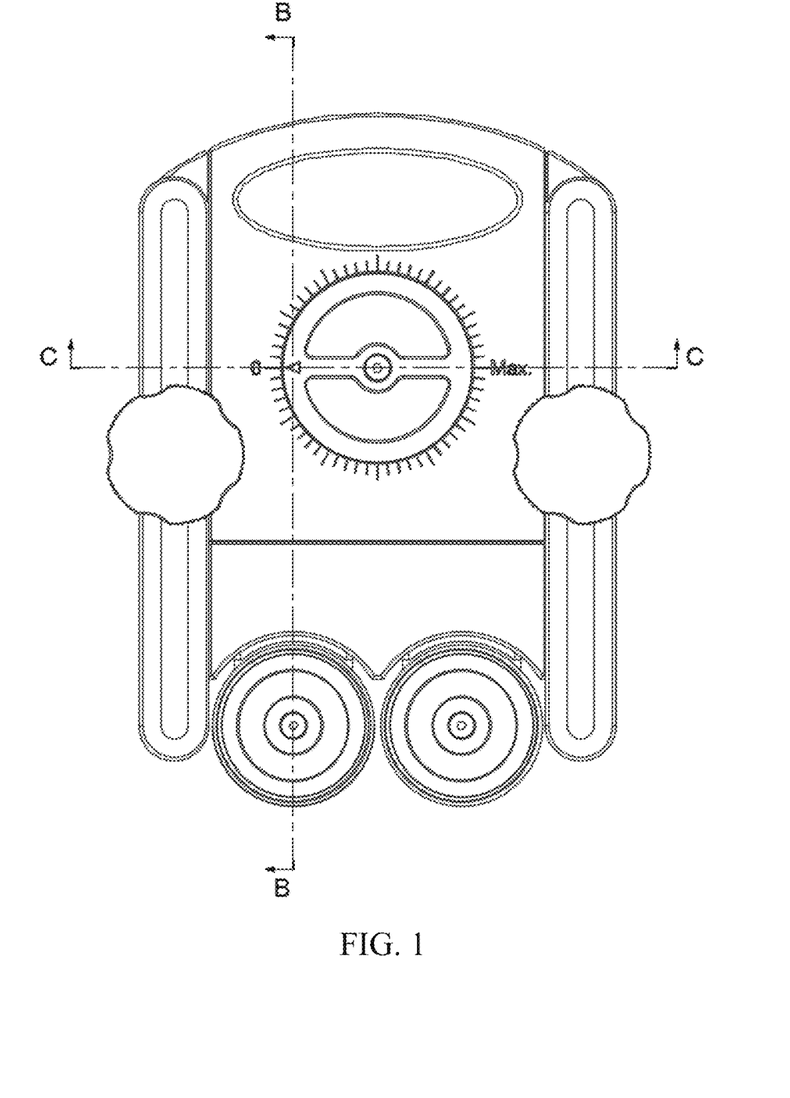
FIG. 1 illustrates a schematic diagram of an overall structure of the present invention.
Figure 2:
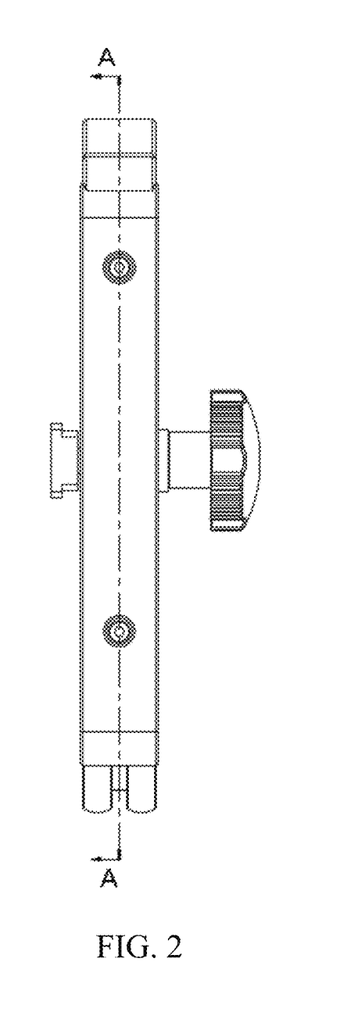
FIG. 2 illustrates a left view of FIG. 1 of the present invention.
Figure 3:
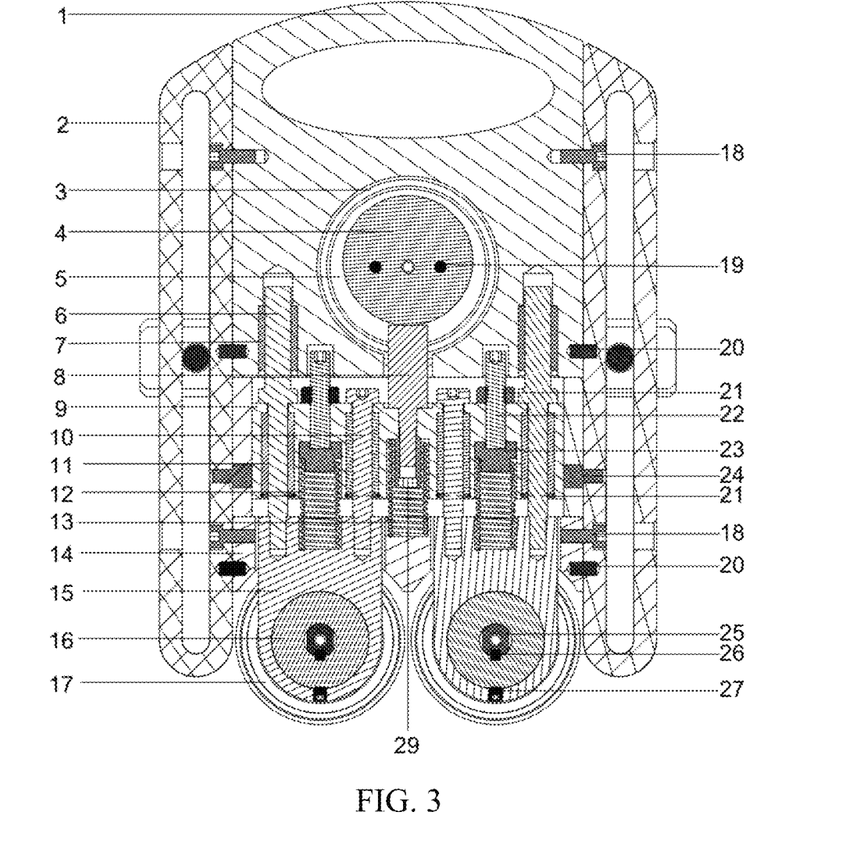
FIG. 3 illustrates an A-A sectional view of FIG. 2 of the present invention.
Figure 4:
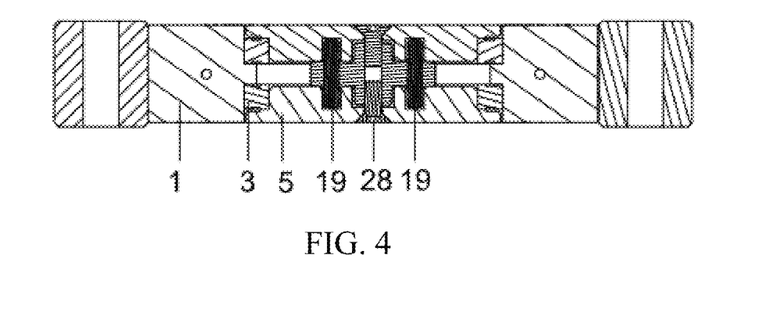
FIG. 4 illustrates a C-C sectional view of FIG. 1 of the present invention.
Figure 5:
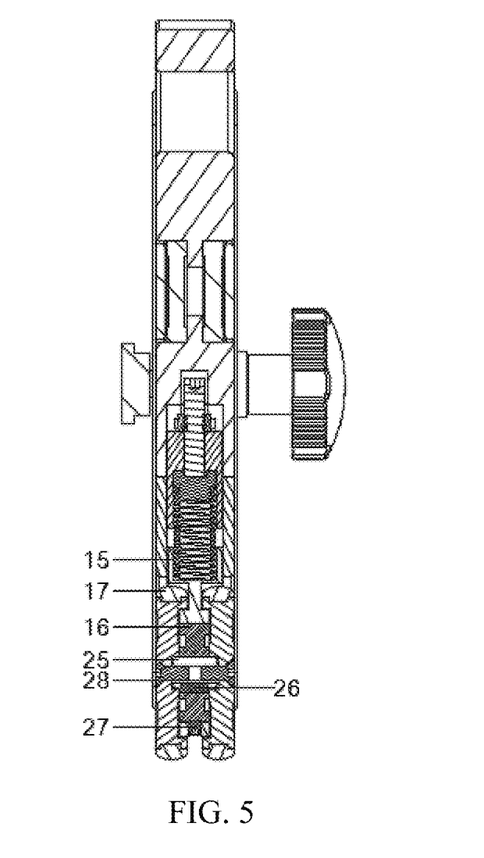
FIG. 5 illustrates a B-B sectional view of FIG. 1 of the present invention.
Figure 6:
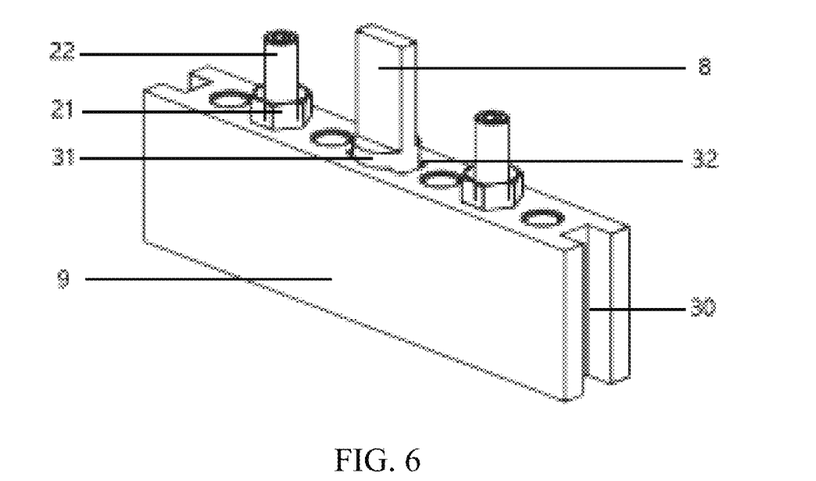
FIG. 6 illustrates a schematic diagram of an overall structure of an sliding block of the present invention.
Figure 7:
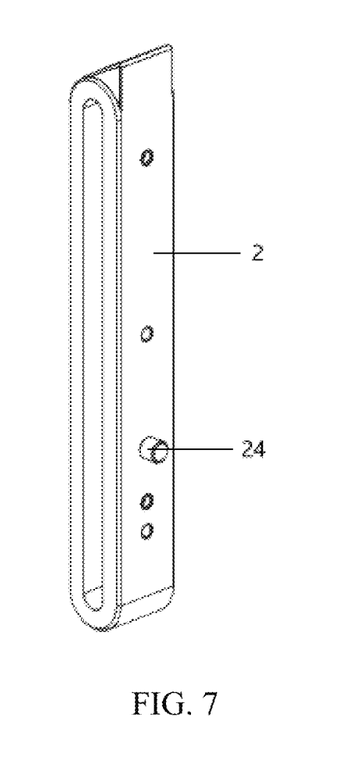
FIG. 7 illustrates a schematic diagram of an overall structure of an second base body of the present invention.

Specifically, as illustrated in FIG. 6, an ear-plate 31 is arranged on an outer wall of the pressing bar 8, and a limiting groove 32 which is in cooperation with the ear-plate 31 is arranged on one side of the sliding block 9 proximate to the base body 1, thereby limiting the axial position of the pressing bar 8 and ensuring that the pressing bar 8 is permanently in contact with the eccentric block 4, and not resulting in offset of the pressing bar 8 caused by the operating of the eccentric block 4.

Specifically, the two compressing mechanisms are symmetrically arranged on both sides of the pressing bar 8. Each of the two compressing mechanisms includes a fastening screw 22, a cushion block 23 and a pressing spring 12. The fastening screw 22 is connected with the sliding block 9. One end of the fastening screw 22 is extended into the first base body 1, and the otherc end of the fastening screw 22 is extended into the sliding block 9 and is provided with the cushion block 23. One side of the cushion block 23 away from the fastening screw 22 is provided with the pressing spring 12, and one end of the pressing spring 12 away from the cushion block 23 is extended to be in connection with the second base body 14. Preferably, a hexagon head tapping fastening screw is adopted as the fastening screw 22. The specific installation steps are as follows. The cushion block 23 is embedded inside the sliding block 9, and then the fastening screw 22 is inserted into the sliding block 9 to be in contact with the cushion block 23. Then, the fastening screw 22 is fixed by a hexagon nut 21, and then one end of the fastening screw 22 away from cushion block 23 is mounted in a groove pre-arranged on the first base body 1 which is in cooperation with the fastening screw 22.

Further, each of the above-mentioned pressing mechanisms includes a roller fixing block 15 and two rollers 17. The roller fixing block 15 is connected with the sliding block 9. Specifically, the roller fixing block is provided with a groove which is in cooperation with the second guide rod 10, thereby achieving the connection between roller fixing block 15 and the sliding block 9 through the second guide rod 10. The two rollers 17 are mounted on both sides of the roller fixing block 15, and each of the rollers 17 is in the same rolling direction. Specifically, the rollers 17 on the both sides are connected with the roller fixing block 15 through a roller shaft 25. Specifically, a one-way bearing 16 is mounted on the roller fixing block 15, thereby allowing the roller 17 to roll in one direction. Preferably, the one-way bearing 16 is locked with the roller fixing block 15 by the hexagon head tapping fastening screw. Preferably, an arc-shaped structure in cooperation with an outer circumference of the roller 17 is provided on one side of the second base body 14 towards the roller 17. Preferably, the roller shaft 25 is provided with a keyway. A flat key 26 is in cooperation with the keyway of the roller shaft 25 and the inside keyway of the one-way bearing 16 through the flat key 26.

The above-mentioned adjustment mechanism further includes a reset mechanism. The reset mechanism includes a reset spring 13. One end of the reset spring 13 is sleeved on one end of the pressing bar 8 away from the first base body 1, and the other end of the pressing bar 8 is extended into the pressing mechanisms. The reset spring 13 is configured to reset the pressing spring 12 at the maximum compression deformation to an initial deformation state.

Further, as the sliding block 9 moves back and forth, the first guide rod 6 will be bent to a certain extent. In order to avoid a bending in a radial direction of the first guide rod 6, a limiting sliding channel 30 and a stepped pin 24 are arranged. Specifically, the limiting sliding channels 30 are provided on both sides of the sliding block 9, and the stepped pin 24 is arranged on the base body fixing block 2. When the limiting sliding channel 30 moves with the sliding block 9, the stepped pin 24 is permanently located inside the limiting sliding channel 30 and in contact with an inner wall of the limiting sliding channel 30. Through the cooperation between the stepped pin 24 and the limiting sliding channel 30, the first guide rod 6 is permanently under force in the radial direction, which effectively prevents a radial deformation of the first guide rod 6 and increases the service life of the first guide rod 6.

In order to facilitate the mounting of the two base body fixing blocks 2 and the device body, a plurality of second cylindrical pins 20 are provided for installation and positioning. Preferably, a number of the second cylindrical pins 20 is four, in which two second cylindrical pins 20 are symmetrically arranged on the two base body fixing blocks 2, and pin holes which are in cooperation with the two second cylindrical pins 20 are provided at the corresponding position of the first base body 1. The other two second cylindrical pins 20 are symmetrically arranged on the two base body fixing blocks 2, and pin holes which are in cooperation with the other two second cylindrical pins 20 are provided at the corresponding position of the second base body 14.

During actual use, due to different personal habits, the one-way rolling of the rollers 17 will bring inconvenience to some operators. Therefore, it is preferable to set the number of the adjustment knobs 5 as two in this implementation. The two adjustment knobs 5 are respectively mounted on two sides of the first base body 1 corresponding to the eccentric block 4. The eccentric block 4 can be rotated by rotating either of the two adjustment knobs 5. Thanks to the arrangement of the two adjustment knobs 5 and the two limiting sliding channels, any side of the device for pressing the materials guided by the rollers can be placed on the working surface without affecting the use of the device. Specifically, the operator selects a required rolling direction according to the convenience of operations, that is, determines which side of the device for pressing the materials guided by the rollers is in contact with the working surface, and then mounts a T-shaped block on one side of the device for pressing the materials guided by the rollers facing the working surface to realize the fixing of the device for pressing the materials guided by the rollers, which can be operated by rotating the adjustment knobs 5.

The specific use method is as follows. The device for pressing the materials guided by the rollers is arranged on the working surface. A T-shaped block is mounted on one side of the device for pressing the materials guided by the rollers facing the working surface. A relative position of the T-shaped block and the sliding channel on the device for pressing the materials guided by the rollers is adjusted until the roller 17 is in contact with the lumber. Then, the device for pressing the materials guided by the rollers is fastened on the working surface by the fasteners, and the position between the device for pressing the materials guided by the rollers and the lumber is limited. The adjustment knobs 5 are rotated, so that the pressing bar 8 in contact with the eccentric block 4 drives the sliding block 9 to move in the direction of the roller 17. The pressing spring is pressed, such that the device for pressing the materials guided by the rollers have the force to press the lumber to realize the purpose of pressing the materials. Preferably, a circle of the adjustment knobs 5 is from 00 to 180°. As the rotated angle of the adjustment button 5 increases, the rising travel of the eccentric block 4 increases, the compressing amount of the compressing spring 12 increases, and the compressing force of the device for pressing the materials guided by the rollers increases. When the adjustment knob is rotated over 180°, the reset spring 13 resets the entire sliding block 9 to the initial position, that is, the position of the sliding block 9 where the adjustment knobs 5 are at 0°.

During the using of this implementation, the device for pressing the materials guided by the rollers is only required to abut the lumber without pre-pressing; and the required pressing force can be adjusted at any time by adjusting the adjustment knob 5, which greatly improves the convenience and comfort of operations, and improves the situations that the existing feather board needs to loose the fixing at both ends, and the deformation amount of the feather board needs to be manually controlled to adjust the pressing force. The roller 17 is fixed on the one-way bearing 16, which increases the lumber rebound resistance and improves the safety.

It will be understood by those skilled in the art that, unless defined otherwise, all terms, including technical terms and scientific terms, used herein have the same meaning as commonly understood by those of ordinary skill in the art. It should also be understood that terms such as those defined in the general dictionary should be understood to have meanings consistent with their meanings in the context of the prior art, and unless defined as herein, are not to be construed in an idealized or overly formal sense.

The meaning of "and/or" described in this present invention includes the situations that each of them is existed separately or both of them are existed at the same time.

The meaning of "connection" described in this present invention may be referred to a direct connection between components or an indirect connection between components through other components.

According to the ideal embodiments of the present invention as inspiration, and through the above descriptions, the relevant personnel would make various changes and modifications without departing from the technical idea of the present invention. The technical scope of the present invention is not limited to the contents in the specification, and the technical scope must be determined according to the scope of the claims.

What is claimed is:

1. A device for pressing materials guided by rollers for a carpentry cutting, comprising a device body, two base body fixing blocks, an adjustment mechanism and two pressing mechanisms, wherein:

the device body comprises a first base body and a second base body, the first base body is adjacent to the second base body, and the first base body is in connection with the second base body;

the two base body fixing blocks are arranged to press both sides of the device body, respectively;

the adjustment mechanism comprises a pushing mechanism, two compressing mechanisms and a reset mechanism, the two pressing mechanisms are moved along a direction from the first base body toward the second base body through the pushing mechanism, and a play between the first base body and the pressing mechanisms is compressed by the two compressing mechanisms;

wherein the pushing mechanism comprises a sliding block, a pressing bar and an eccentric block, wherein the sliding block is located inside the second base body and is connected with the two pressing mechanisms, the eccentric block is mounted inside the first base body, the pressing bar is connected with the sliding block, one end of the pressing bar is in contact with an outer circumferential surface of the eccentric block, and another end of the pressing bar is extended into the sliding block;

the two compressing mechanisms are symmetrically arranged on both sides of the pressing bar, each of the two compressing mechanisms comprises a fastening screw, a cushion block, and a pressing spring, wherein the fastening screw is connected with the sliding block, one end of the fastening screw is extended into the first base body, and another end of the fastening screw is extended into the sliding block, and is provided with the cushion block, one side of the cushion block away from the fastening screw is provided with the pressing spring, and one end of the pressing spring away from the cushion block is extended to be in connection with the second base body;

the reset mechanism comprises a reset spring, one end of the reset spring is sleeved on one end of the pressing bar away from the first base body, and another end of the pressing bar is extended into the pressing mechanisms; and each of the pressing mechanisms comprises a roller fixing block connected with the sliding block, and two rollers with a same rolling direction, the two rollers are respectively mounted on both sides of the roller fixing block.

2. The device for pressing the materials guided by the rollers for the carpentry cutting according to claim 1, wherein the device further comprises two first bushings, two second bushings and two first guide rods, wherein the two first bushings are mounted inside the first base body with respect to the pressing bar as a symmetry axis, the two second bushings are mounted inside the sliding block with respect to the pressing bar as a symmetry axis, one end of each of the first guide rods is inserted into one of the first bushings respectively, and another end of each of the first guide rod is inserted into one of the second bushings respectively and extended to be in connection with the roller fixing block.

3. The device for pressing the materials guided by the rollers for the carpentry cutting according to claim 1, wherein the device further comprises an ear-plate and a limiting groove, wherein the ear-plate is arranged on the pressing bar, the limiting groove is arranged on one side of the sliding block proximate to the first base body, and the ear-plate on the pressing bar is mounted in cooperation with the limiting groove to limit an axial position of the pressing bar.

4. The device for pressing the materials guided by the rollers for the carpentry cutting according to claim 1, wherein the device further comprises two third bushings and two second guide rods, the two third bushings are mounted inside the sliding block with respect to the pressing bar as a symmetry axis, and the third bushings are located between the pressing bar and the second bushings respectively, and the second guide rods penetrate the sliding block and extend through the third bushings to be in connection with the roller fixing blocks.

5. The device for pressing the materials guided by the rollers for the carpentry cutting according to claim 1, wherein the device further comprises a cylindrical nut mounted on one end of the pressing bar away from the eccentric block to connect the pressing bar with the sliding block.

6. The device for pressing the materials guided by the rollers for the carpentry cutting according to claim 1, wherein the device further comprises limiting sliding channels and two stepped pins, the limiting sliding channels are arranged on both sides of the sliding block, the two stepped pins are symmetrically arranged on the two base body fixing blocks, and the stepped pins are permanently located in the limiting sliding channels.

7. The device for pressing the materials guided by the rollers for the carpentry cutting according to claim 1, wherein the device further comprises two one-way bearings, the one-way bearings are mounted on the roller fixing blocks respectively to allow the rollers to roll in one direction.

8. The device for pressing the materials guided by the rollers for the carpentry cutting according to claim 1, wherein the device further comprises an adjustment knob mounted on two side surfaces of the first base body corresponding to the eccentric block.

* * * * *